Nov. 3, 1953     O. SALADIN ET AL     2,657,979
METHOD OF RECOVERING METALLIC OXIDES
Filed Feb. 21, 1950
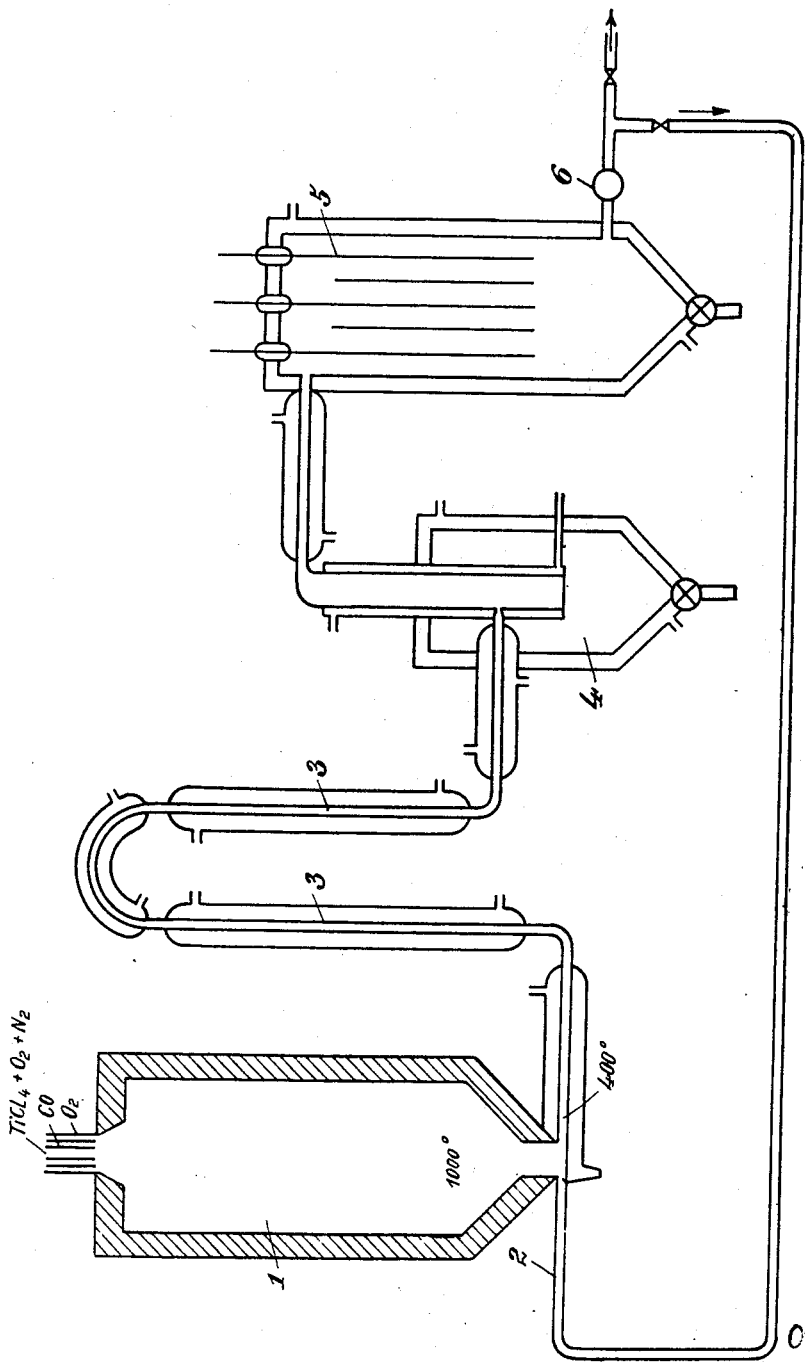
Inventors
Otto Saladin
Waldemar Schornstein
by Walter Frey
Attorneys Patented Nov. 3, 1953

2,657,979

UNITED STATES PATENT OFFICE 2,657,979

METHOD OF RECOVERING METALLIC OXIDES

Otto Saladin, Schweizerhalle, Waldemar Schornstein, Arlesheim, and Walter Frey, Basel, Switzerland, assignors to Saeurefabrik Schweizerhall, Schweizerhalle, Baselland, Switzerland, a corporate body of Switzerland Application February 21, 1950, Serial No. 145,498
Claims priority, application Switzerland
March 5, 1949

4 Claims. (Cl. 23—202)

This invention relates to certain improvements in or relating to a method of recovering metallic oxides from reaction gases, said oxides being formed by decomposition of metallic halides with oxygen containing gases.

The decomposition of volatile metallic halides by means of oxygen containing gases such as oxygen, air or other gases containing elementary oxygen for the purpose of recovering metallic oxides at high temperatures above 800° C., but advantageously at 1000° C. and more is known. This decomposition is performed with an excess of oxygen. In this way the metallic oxide is obtained in very fine suspension in a very hot gas. This reaction gas essentially consists of halogen, in particular chlorine, oxygen, inert gases, and, in the event of using fuel gases during the decomposition, also contains carbonic acid and ultimately hydrochloric acid and water vapor.

In the application of this process on a large scale, the recovery of metallic oxides from such hot gases which are very offensive and corrosive due to the presence of halogen, involves considerable difficulties. Metallic oxides, in particular the white ones, such as titanium dioxide, produced from the highly purified chloride and intended to be used as pigments, are very sensitive to coloring contaminations, in particular to colored chlorides and oxides. Titanium oxide, for instance, is colored even by insignificant quantities of iron oxide or iron chloride (less than 10 mg. of Fe/kg) and thus loses its pure white color and gloss. There is therefore the great danger that in cooling the products of reaction and in eliminating the metallic oxide, the latter may be contaminated by the apparatus. As is known, the halogens, and in particular chlorine, attack most of the usual constructional materials of metallic and oxidic nature thereby liberating volatile chlorides. Thus e. g. the easily volatile ferric-III-chloride is produced from ferrugenous alloys and iron oxide containing refractory materials. It has been found that materials having a content of 1% or less of iron and iron oxide respectively are so heavily attacked by the chlorine of the reaction gas under formation of volatile iron chloride that the titanium oxide present in the reaction gases will be discolored. Other materials may be attacked under liberation of volatile halides of chrome, vanadium, molybdenum etc. according to their composition.

It has been proposed to attempt large scale recovery of metallic oxide from the reaction gases in pure form in such a manner as to cool the gases as they first issue from the reactor in an apparatus consisting of a refractory material free from coloring metallic oxides, in particular from iron oxide, separating it then from the gases by means of dust separators, in particular cyclones, electric filters and the like. This method may be suitable in laboratory production but turns out to be inapplicable to large-scale production as it requires, due to the unfavorable heat transfer of all refractory materials, an apparatus of excessive dimensions which in addition would be very sensitive to mechanical stress.

It has further been proposed to remove the metallic oxide, e. g. the titanium oxide, from the hot gases by means of ceramic filters, e. g. filter candles. If the temperature at which the metallic oxide is eliminated is still above the dew point of the coloring chlorides, e. g. above 300° C., contamination by volatile chlorides can be largely avoided. The ceramic filters, however, have the great disadvantage of a very low capacity which requires the use of a great number of ceramic filters and a repeated cleaning of the same after short periods which again greatly impairs a continuous operation.

There is another difficulty consisting in the very high concentration of the solid metallic oxide in the gas (which according to the conditions of operation may amount up to 1 kg. per m.$^3$ of cold gas), which results in the metallic oxide being deposited everywhere in conduits, coolers, slide valves etc. thus causing obstructions.

Now it has been found, that these difficulties can be avoided or eliminated by strongly reducing the temperature of the products of reaction of the process of decomposition preferably to at least 600° C. by adding a gas colder than the products of reaction and inert under the prevailing circumstances and removing thereupon the solid metallic oxide from the gaseous mixture. The quantity of the gas to be added may be so regulated as to reduce the temperature to 100° C. and still further, so that the metallic oxide may be removed from the gas without further cooling by means of known dust separators. It is, however, not at all necessary to use large quantities of such cold gases. It has been further found that the temperature of the products of reaction by adding such a colder gas needs to be reduced only so far as to permit withdrawal of the heat content of the gaseous mixture by indirect cooling, e. g. through the walls of the apparatus consisting in this case of a material of high thermal conductivity, such as metals, whereupon the solid metallic oxide is removed from the mixture. In as far as the cooling of the metallic walls of the apparatus, which is advantageously effected by liquids, in particular water, is sufficiently intense there will be no longer any substantial attack on the metal by the halogen contained in such pretreated reaction gas. The use of aluminium as material for the cooling apparatus has proved to be particularly advantageous in this case, as the residual oxygen of the decomposition contained in the reaction gas causes the formation of an oxide film on the walls of the apparatus which is not attacked by chlorine. It is advantageous to employ aluminium already having an oxide film due to a corresponding, e. g. electro-chemical pretreatment.

The reduction of the temperature of the reaction gas may be effected by adding inert gases, e. g. dry dustfree air or advantageously by adding cooled, preferably dustfree reaction gas. Gases cooled to low temperatures or liquefied inert gases may find application too. It is also possible, however, to use only one component, e. g. the halogen of the reaction gas, for cooling. The quantity of cooling gas to be applied is dependant on the composition of the reaction gas on the one hand and of the cool gas on the other. It depends further on the temperature of the reaction gas and of the cool gas and on the desired temperature of the mixture. The quantity of the cold gas to be added in general will be equal to that of the reaction gas produced, but will in many cases amount to a multiple thereof. The application of dustfree cold gases reduces the concentration of the solid metallic oxide in the gas to a fraction of the original concentration, so that the metallic oxide in the gas may be easily conducted through the conduits without obstructing the same.

The withdrawal of the heat content of the cooled gaseous mixture through the metallic walls of the apparatus may take place at least simultaneously with the removal of the solid metallic oxides by applying cooled dust separators (cyclones, electric filters and the like) made of metallic materials.

Referring now specifically to the accompanying drawing, there is diagrammatically illustrated an apparatus for carrying out the method according to this invention, in which I designates the reaction furnace for the decomposition of the metallic chlorides which enter at the top of the furnace together with the oxygen-containing gas while the reaction products leave the furnace at the bottom outlet, 2 the nozzle for admixing cold dustfree reaction gas with the hot reaction gases as they pass from furnace I, 3 the cooling apparatus consisting of water jacketed tubes, 4 a cyclone, 5 an electric filter, and 6 a fan. After passing the fan the gas is divided into two streams by valve control means, one stream being recirculated to cool the reaction gas flowing from the furnace I and the other stream leaving the system for other uses (not shown). The working of the process according to the invention is, however, not limited to the apparatus illustrated, but may be effected in any other apparatus permitting an admixture of cold gas to hot gas.

The following example will serve to further explain the process and the working of the process in the apparatus as shown in the drawing.

20 kg./hour of titanium chloride are decomposed according to Swiss Patent 265,192 with 9 kg./hour of oxygen/nitrogen mixture, 3 kg./hour of carbon oxide and 1.7 kg./hour of oxygen of 98 per cent purity in a reaction furnace I. The reaction gases leave the furnace at the bottom at a temperature of approximately 1000° C. and are composed of 41% of $Cl_2$, 20.5% of $CO_2$, 29.5% of $N_2$ and 9% of $O_2$, and contain approximately 750 gr./m³ of $TiO_2$ (corrected to gas under normal conditions). Immediately after leaving the reaction furnace, double the quantity of the reaction gas formed in the process of oxidation but freed from titanium oxide and having a temperature of approximately 20° C. is admixed at the exit of furnace with the hot reaction gas through nozzle 2, i. e. approximately 50 kg./hour of gas of the same composition as referred to above. This provides a temperature of the mixture of about 400° C. and reduces the concentration of titanium oxide to 250 gr./m.³. The gas containing the suspension is then cooled to about 150° C. in water-cooled aluminium tubes 3, whereupon the oxide is removed from the gas by means of a water-cooled cyclone 4 and a likewise water-cooled electric filter 5 of aluminium. After the metallic oxide is separated, the gaseous current is divided, two thirds of the gas being used again, preferably after previously having been subjected to further cooling, while the remaining part of the gas may be employed for other purposes, e. g. to chlorinate titanium ores.

What is claimed is:

1. In the recovery of a finely divided metallic oxide from a halogen and oxygen containing hot gaseous suspension thereof produced by the decomposition and oxidation of a volatile metallic halide in the presence of an excess of oxygen at temperatures above 800° C., the process which comprises first rapidly cooling the gaseous suspension to a temperature not exceeding 600° C. by adding to the suspension a cooling fluid inert thereto, then further cooling the suspension in at least one cooling zone by abstracting heat from it therein through externally cooled gas impervious zone bounding walls composed predominantly of metallic aluminum and bearing a thin integral film of aluminum oxide over their internal surfaces, and then separating said metallic oxide from the cooled suspension gases.

2. In a process for recovering a finely divided metallic oxide from a halogen and oxygen containing gaseous suspension thereof produced by the decomposition and oxidation of a volatile metallic halide in the presence of an excess of oxygen at temperatures above 800° C., first rapidly cooling said suspension to a temperature not exceeding 600° C. by adding to the suspension a cooling gas inert thereto, then further cooling the gaseous suspension in a plurality of successive cooling zones by abstracting heat from it therein through externally cooled gas impervious zone bounding walls composed predominantly of metallic aluminum and bearing a thin integral film of aluminum oxide over their internal surfaces, and then separating said metallic oxide from the cooled suspension gases.

3. In the production of pigments by the decomposition and oxidation of a volatile metallic halide in the presence of an excess of oxygen at temperatures above 800° C., whereby a halogen and oxygen containing hot gaseous suspension of finely divided metallic oxide is formed, the process which comprises first rapidly cooling said suspension to a temperature not exceeding 600° C. by mixing with said suspension a cooled gaseous product previously formed by such decomposition and oxidation, then further cooling said suspension in at least one cooling zone by abstracting heat from it therein through externally cooled gas impervious zone bounding walls composed predominantly of metallic aluminum and bearing a thin integral film of aluminum oxide over their internal surfaces, and then finally cooling said suspension and precipitating said metallic oxide therefrom in a precipitating zone bounded by externally cooled gas impervious walls composed predominantly of metallic aluminum and bearing a thin integral film of aluminum oxide over their internal surfaces.

4. In the production of titanium dioxide pigments by the decomposition and oxidation of titanium tetrachloride in the presence of an excess of oxygen at temperatures above 800° C., whereby a chlorine and oxygen containing hot gaseous suspension of titanium dioxide is formed, the process which comprises first rapidly cooling said suspension to a temperature not exceeding 600° C. by mixing with said suspension a cooled gaseous product previously formed by such decomposition and oxidation and substantially freed of titanium dioxide, then further cooling said suspension in at least one cooling zone by abtracting heat from it therein through externally cooled gas impervious zone bounding walls composed predominantly of metallic aluminum and bearing a thin integral film of aluminum oxide over their internal surfaces, and then finally cooling said suspension and precipitating titanium dioxide from it in a precipitating zone bounded by externally cooled gas impervious walls composed predominantly of metallic aluminum and bearing a thin integral film of aluminum oxide over their internal surfaces.

OTTO SALADIN.
WALDEMAR SCHORNSTEIN.
WALTER FREY.

References Cited in the file of this patent

UNITED STATES PATENTS

| Number | Name | Date |
|---|---|---|
| 1,931,381 | Haber | Oct. 17, 1933 |
| 1,967,235 | Ferkel | July 24, 1934 |
| 2,240,343 | Muskat | Apr. 29, 1941 |
| 2,347,496 | Muskat et al. | Apr. 25, 1944 |
| 2,367,118 | Heinen | Jan. 9, 1945 |
| 2,394,633 | Pechukas et al. | Feb. 12, 1946 |
| 2,450,156 | Pechukas | Sept. 28, 1948 |
| 2,488,439 | Schaumann | Nov. 15, 1949 |
| 2,488,440 | Schaumann | Nov. 15, 1949 |
| 2,541,495 | Buchanan | Feb. 13, 1951 |

OTHER REFERENCES

"Titanium," by W. M. Thornton, 1927 ed., page 62. The Chemical Catalog Co., Inc., N. Y.

"A Comprehensive Treatise on Inorganic and Theoretical Chemistry," by J. W. Mellor, vol. 14, pages 20, 609, Longmans, Green and Co., N. Y.